H. G. LOCKE.
Hop-Picking Machine.
No. 201,026. Patented March 5, 1878.
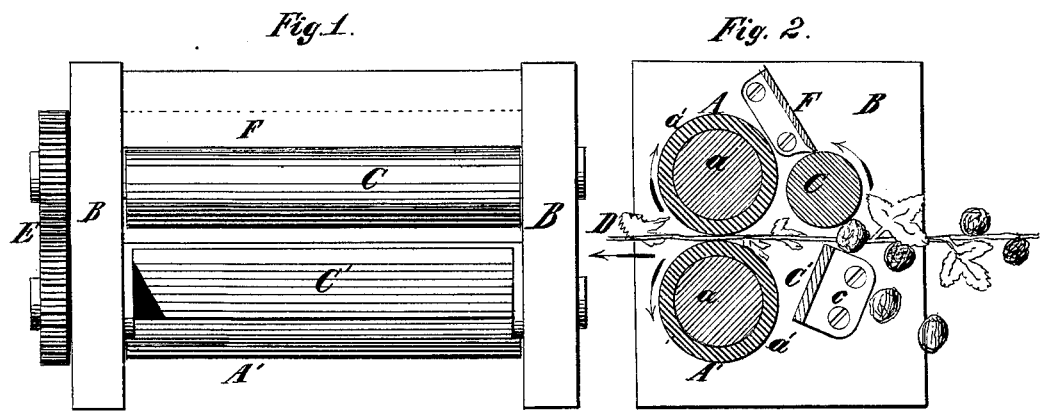
Witnesses:
Fred. Haynes
L. Allen
Inventor
Herbert G. Locke
by his Attorneys
Brown & Allen

UNITED STATES PATENT OFFICE.

HERBERT G. LOCKE, OF WATERVILLE, NEW YORK.

IMPROVEMENT IN HOP-PICKING MACHINES.

Specification forming part of Letters Patent No. 201,026, dated March 5, 1878; application filed August 20, 1877.

*To all whom it may concern:*

Be it known that I, HERBERT G. LOCKE, of Waterville, in the county of Oneida, and the State of New York, have invented an Improvement in Machines for Picking Hops; and I do hereby declare that the following is a full, clear, and exact description of the same, reference being had to the accompanying drawing, forming a part of this specification.

My invention consists, first, in the combination, with rollers arranged to clamp and draw along the hop-vine, of two stripping or picking bars, one stationary and the other having a rotary motion in a direction opposite to that of the drawing-roller on the same side of the vine; and, second, in the combination, with the above-named devices, of a guard or fender, for preventing the picked hops from being thrown between the drawing-rollers.

The stripping or picking bars are arranged in front of the drawing-rollers, and at such a distance apart as to permit the vine, but not the hops, to pass between them; and the drawing-rollers are set so close together that when the end of the vine is introduced between them they clamp it by reason of their rotation in opposite directions, and pull its whole length between the stripping or picking bars, by which the hops are removed from the vine, the rotary bar, by its brushing action, greatly facilitating the removal of the hops and throwing them outward, thus preventing clogging of the machine and damage to the flowers, which, by the guard or fender, are prevented from being thrown between the drawing-rollers.

In the drawing, Figure 1 is a front elevation of my invention, and Fig. 2 is a vertical section taken in the plane of the path of the vine.

The letters A and A′ represent the clamping and drawing rollers. Said rollers may be made of any hard material suitable for the purpose, and their surfaces may be either smooth or fluted. In order to firmly clamp the vine, these rollers should be pressed together by springs, weighted levers, or other suitable devices.

I prefer to construct these rollers each with a hard central core, as shown at *a*, and an elastic covering, *a′*, of sheet india-rubber or similar material, and said rollers may have either adjustable or fixed bearings in the frame B of the machine.

C designates the rotary stripping or picking bar; C′, the stationary bar; and F is the guard or fender, which prevents the hops from being thrown between the drawing-rollers by the rotary bar C, which has its bearings in opposite sides of the frame B. The stationary bar C′ is also secured to the opposite side of the frame.

The projecting journals of the drawing-rollers carry meshing gear-wheels E, and the projecting journal of the rotary bar C should carry a gear-wheel meshing with that of the roller A; or it may be driven by a belt passing around it and said roller, and its rotation is in a direction opposite to that of said roller.

The guard F is a bar rigidly attached to the opposite sides of the frame, and is arranged parallel with the rotary bar C, and so close thereto as to scrape off any of the hops which adhere to said bar on account of the gummy exudation with which the rotary bar becomes more or less covered by its contact with the flowers and broken stems.

The machine may be provided with any of the ordinary devices for transmitting motion from a suitable motor, or it may have a fly-wheel and crank, for operation by hand.

The end of the hop-vine is passed through between the stripping or picking bars C C′, and caught by the clamping and drawing rollers A A′, by which it is drawn between the said stripping or picking bars, by which the hops are stripped or brushed off, and, falling down in front of the machine, are gathered for the subsequent operations of kiln-drying and baling.

Having now fully described and explained the operation of my invention, I claim—

1. The combination, in a hop-picking machine, of a pair of drawing-rollers for moving the vine longitudinally, a stationary stripping-bar and rotary bar, arranged to brush the vine in a direction opposite that in which said vine is moved, substantially as and for the purpose set forth.

2. In a hop-picking machine, the vine-drawing rollers, stationary stripping-bar C′, rotary stripping-bar C, and the guard F, for preventing the hops from being thrown between the drawing-rollers, substantially as set forth.

HERBERT G. LOCKE.

Witnesses:
DAVID H. TARR,
SILAS CLARKE.